United States Statutory Invention Registration [19]

[11] Reg. Number: H946

Lonn [43] Published: Aug. 6, 1991

[54] TIP AND ADAPTOR ASSEMBLY

[75] Inventor: Alan H. Lonn, Edelstein, Ill.

[73] Assignee: Caterpillar Inc., Peoria, Ill.

[21] Appl. No.: 664,247

[22] Filed: Mar. 4, 1991

[51] Int. Cl.[5] ..... E01C 19/26

[52] U.S. Cl. ..... 404/121; 404/124; 301/44 R; 172/122; 172/554

[56] References Cited

U.S. PATENT DOCUMENTS

| | | | |
|---|---|---|---|
| 3,274,908 | 9/1966 | Grant et al. | 94/48 |
| 4,074,942 | 2/1978 | Cochran | 404/121 |
| 4,918,843 | 4/1990 | Kiesewetter et al. | 37/142 |
| 4,919,566 | 4/1990 | Caron et al. | 404/121 |

*Primary Examiner*—Michael J. Carone
*Attorney, Agent, or Firm*—J. W. Burrows

[57] ABSTRACT

Tip and adaptor assemblies are normally utilized to provide an arrangement in which the tip can be readily removed from the adaptor. It is advantageous to have a simple construction while still maintaining both good traction of the compactor wheel and good demolition of the material being crushed. In the subject arrangement, the tip and adaptor assembly is simple in construction and the tip, when worn, is readily removable from the adaptor. Furthermore, the tip includes both a demolition cleat and a transversely oriented traction cleat. All of the downward forces from the compactor wheel is transferred from a outer load transferring surface of the adaptor to a load transferring surface of the tip.

1 Claim, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TIP AND ADAPTOR ASSEMBLY

DESCRIPTION

1. Technical Field

This invention relates generally to compactor teeth for a compactor wheel and more particularly to a tip and adaptor assembly for use on a compactor wheel.

2. Background Art

Compacting wheels are normally used in landfill operations to grind and/or crush materials to reduce the size and bulk of the materials. U.S. Pat. No. 4,074,942 which issued Feb. 21, 1978 to Thomas E. Cochran teaches a compactor tip (tooth) which may be welded to a compactor wheel. In this arrangement, many teeth are welded to the wheel to provide teeth totally around the circumference of the compactor wheel. U.S. Pat. No. 3,274,908 which issued Sept. 27, 1966 to G. E. Grant et al. teaches compactor teeth that may be pinned to an adaptor which is welded to the compactor wheel. By having the compactor teeth pinned to the compactor wheel, removal of the teeth for replacement purposes is faster. U.S. Pat. No. 4,919,566 which issued Apr. 24, 1990 to James O. Caron et al teaches several other arrangements in which the compactor teeth may be pinned to an adaptor that is welded to the compactor wheel. U. S. Pat. No. 4,918,843 issued Apr. 24, 1990 to M. V. Kiesewetter et al. teaches a pin retaining mechanism having a split spring retainer and an elastomeric holder adapted to center the split spring retainer in the counterbore of the adaptor.

It is desirable to provide a simple arrangement that allows quick replacement of the compactor teeth and to simultaneously provide both traction for the wheel and demolition of the material being crushed. It is also desirable to minimize the number of teeth on the compactor wheel to reduce the tendency of debris becoming embedded between the teeth.

The present invention is directed to overcoming one or more of the problems as set forth above.

DISCLOSURE OF THE INVENTION

In one aspect of the present invention, a tip and adaptor assembly is provided for use on a compactor wheel. The tip and adaptor assembly includes an adaptor having an inner surface that is adapted to be secured to the compactor wheel. The adaptor further has first and second side surfaces each respectively sloping inwardly and outwardly from the inner surface, first and second end surfaces each respectively sloping inwardly and outwardly from the inner surface, an outer load transferring surface, a hole defined in the adaptor extending between the first and second side surfaces, and a counterbore defined in the adaptor extending from the first side surface and in axial alignment with the hole. The tip and adaptor assembly also includes a tip having an inner mounting portion and an outer ground engaging portion. The outer ground engaging portion is formed to include both a traction cleat portion and a demolition cleat portion disposed transversely of the traction cleat portion. The inner mounting portion of the tip includes a cavity defined therein and adapted to freely receive the adaptor. A load transferring surface is located on the tip at the bottom of the cavity and when the tip is assembled with the adaptor, the load transferring surface contacts the outer load transferring surface of the adaptor. A pair of aligned passages is defined in the inner portion of the tip and opens into the cavity. When assembled, the hole in the adaptor and the pair of aligned passages are in substantial alignment. A pin retaining mechanism is provided in the tip and adaptor assembly and adapted to be disposed, when assembled, in the counterbore. A pin is provided in the tip and adaptor assembly and is adapted to be disposed, when assembled, through the pair of aligned passages in the tip, the pin retaining mechanism in the counterbore, and the hole in the adaptor.

The present invention provides a simple non-complex tip and adaptor assembly having an easily removable tip and an adaptor that can be welded to a compactor wheel to provide both traction and compaction while still maintaining the ability to quickly and easily change the tips.

BEST MODE FOR CARRYING OUT THE INVENTION

Figure 3:
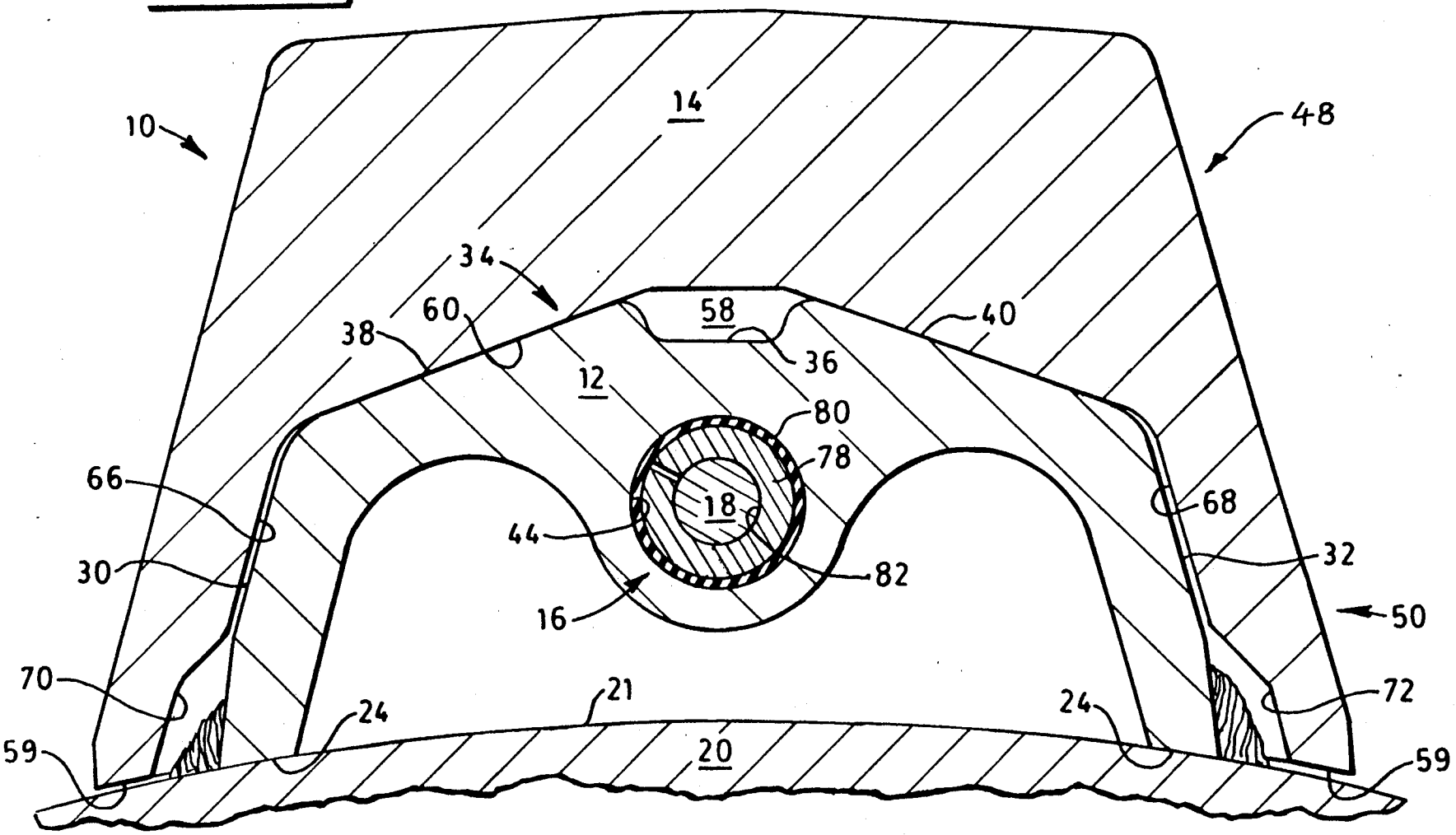
FIG. 3 is a cross-sectional view of the tip and adaptor assembly taken transverse to the centerline of the retaining pin.

Referring to the drawings, a tip and adaptor assembly 10 is shown. The tip and adaptor assembly 10 includes an adaptor 12, a tip 14, a pin retaining mechanism 16, and a pin 18. The tip and adaptor assembly 10 is adapted for use on a compactor wheel 20 (FIG. 3).

The adaptor 12 has an inner surface 24 that is generally arcuate in shape and adapted to be welded to a peripheral surface 21 of the compactor wheel 20. The adaptor 12 also has first and second side surfaces 26,28 each respectively angling inwardly and outwardly from the inner surface 24. First and second end surfaces 30,32 are located on the adaptor 12 and each respectively angle inwardly and outwardly from the inner surface 24. An outer load transferring surface 34 is provided on the adaptor 12. A slot 36 is defined in the outer portion of the adaptor 12 and divides the outer load transferring surface 34 into first and second load bearing pads 38,40. A hole 42 is defined in the adaptor 12 and extends from the first side surface 26 to the second side surface 28. The hole 42 is centrally located between the first and second end surfaces 30,32 at a location spaced from the inner surface 24. A counterbore 44 is defined in the adaptor 12 extending from the first side surface 26 and in axial alignment with the hole 42.

The tip 14 includes an outer ground engaging portion 48 and an inner mounting portion 50. The outer ground engaging portion 48 is formed to include both a traction cleat portion 52 and a demolition cleat portion 54. The demolition cleat portion 54 is disposed on the tip 14 so that when assembled the length of the demolition cleat extends circumferentially along the peripheral surface 21 of the compactor wheel 20. The traction cleat portion 52 is centrally disposed on the tip 14 transverse to the demolition cleat portion 54 to form a "plus" configuration.

The inner mounting portion 50 includes a cavity 58 defined therein extending into the tip 14 from a bottom surface 59. A load transferring surface 60 is located on the tip 14 at the bottom of the cavity 58. First and second side surfaces 62,64 are located on the tip 14 inside the cavity 58 and first and second end surfaces 66,68 are also located on the tip 14 inside the cavity 58. Each of the first and second side surfaces 62,64 and the first and second end surfaces 66,68 slope inwardly and outwardly to blend with the load transferring surface 60. First and second clearance slots 70,72 are each defined in the tip 14 at the ends of the respective first and second end portions 66,68 adjacent the inner surface 59. A pair of aligned passages 74 is defined in the inner mounting portion 50 and opens into the cavity 58.

The pin retaining mechanism 16 includes an annular split spring retainer 78 and an elastomeric spacer 80. The split spring retainer 78 defines an internal diameter 82 and an external diameter 84. The elastomeric spacer 80 defines an internal bore 86 and a counterbore 88 axially aligned with the internal bore 86 thereof. The diameter of the counterbore 88 and the external diameter 84 of the split retainer 78 are substantially the same while the internal diameter 82 of the split spring retainer 78 is substantially the same size as the internal bore 86 of the elastomeric spacer 80. The elastomeric spacer 80 is of a size sufficient to snugly fit into the counterbore 44 of the adaptor 12.

The pin 18 has a length sufficient to extend, when assembled, through the pair of aligned passages 74 of the tip 14. A groove 90 is defined on the pin 18 spaced from one end thereof and defines a diameter on the pin 18 smaller than the internal diameter 82 of the split retainer 78. The pin 18 defines a diameter that is larger than the internal diameter 82 of the split retainer 78.

Industrial Applicability

In use, each end of the adaptor 12, where the respective first and second end surfaces 30,32 meet the peripheral surface 21 of the wheel 20, is welded to the wheel 20. Normally, many adaptors 12 are welded to the circumference of the compactor wheel 20 until the desired number and the desired pattern of the adaptors 12 on the wheel 20 are achieved. The adaptors 112 are welded to the compactor wheel 20 in a manner such that the first and second side surfaces 26,28 are aligned transverse to the axis of the compactor wheel 20.

During assembly of the tip 14 to the adaptor 12, the split spring retainer 84 is placed into the counterbore 88 of the elastomeric spacer 80 and the assembled pin retaining mechanism 16 is placed in the counterbore 44 of the adaptor 12 with the split spring retainer 84 located at the bottom of the counterbore 44.

The tip 14 is mounted on the adaptor 12 such that the adaptor 12 extends into the cavity 58 of the tip 14. Once the tip 14 is in place, the first and second load bearing pads 38,40 of the outer load transferring surface 34 of the adaptor is in mating contact with the load bearing surface 60 of the tip 14. The clearance slots 70,72 on the tip 14 provide the needed clearance for the weld joints created by the welding of the adaptor 12 to the compactor wheel 20. Since the weld joints are covered by the tip 14, the weld joints are not subjected, during use, to extreme wear.

Figure 1:
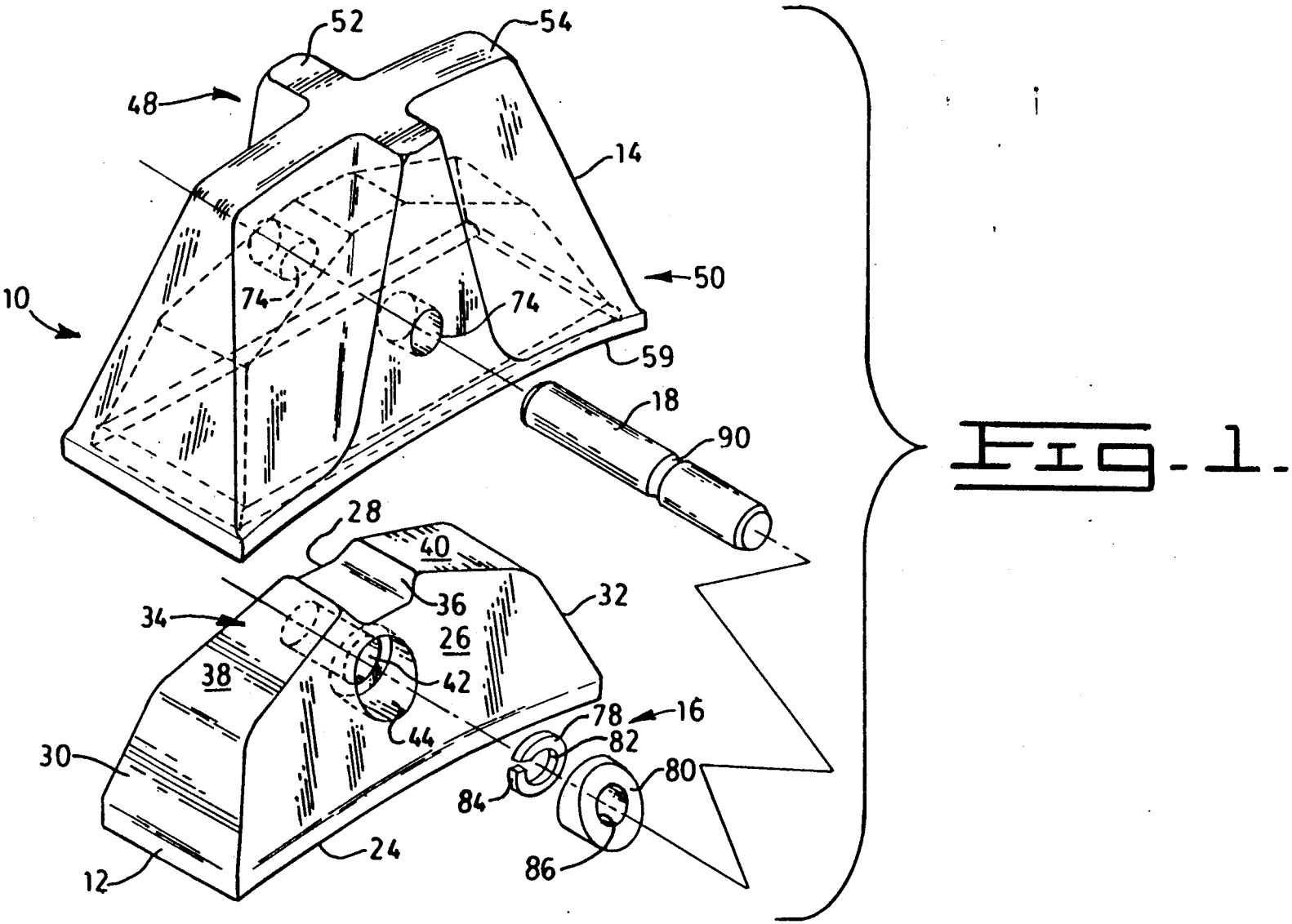
FIG. 1 is an isometric drawing representing the individual components of an embodiment of the present invention.
Figure 2:
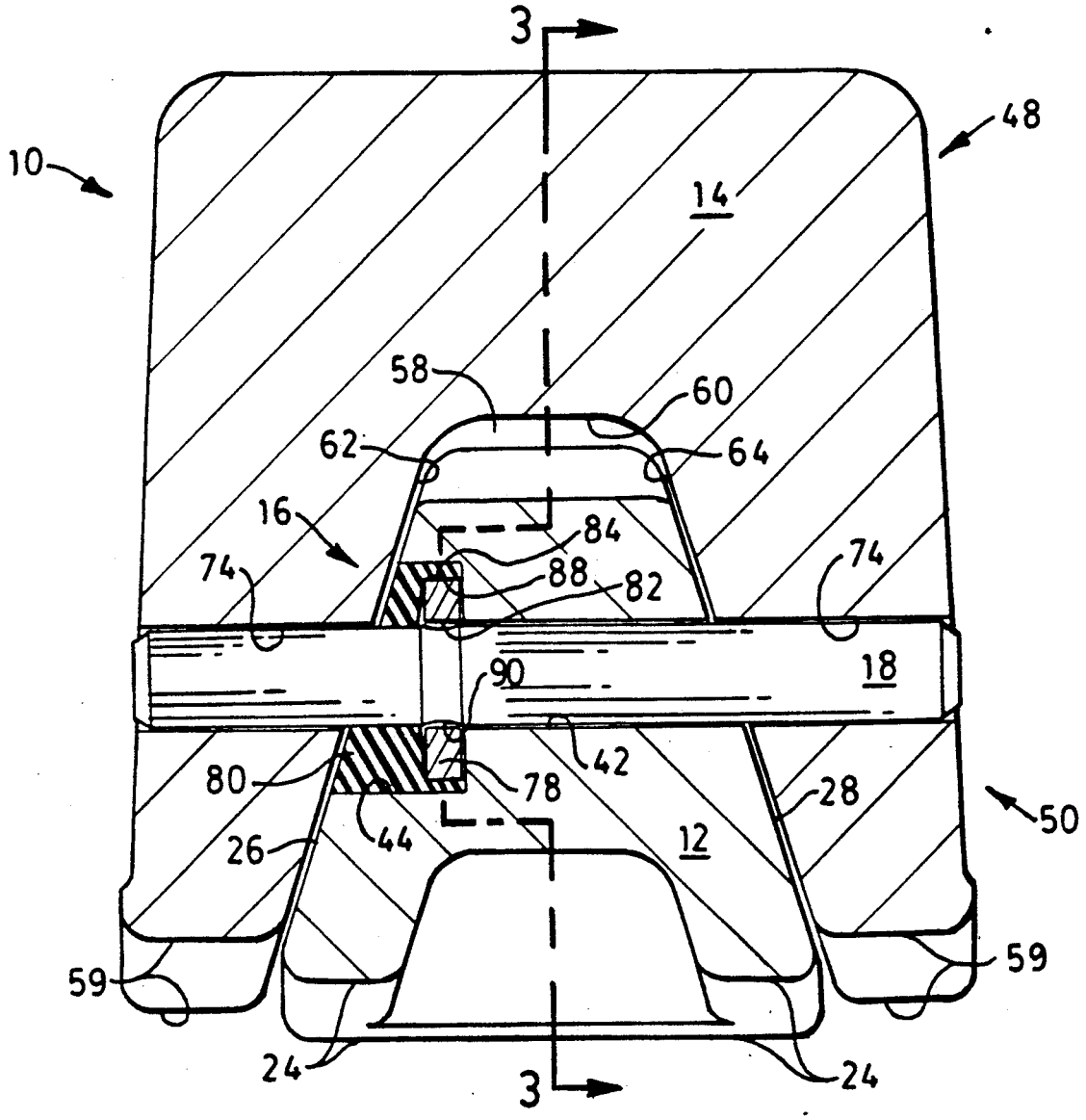
FIG. 2 is a cross-sectional view of a tip and adaptor assembly taken through the centerline of the retaining pin.

From a review of FIGS. 2 and 3, it is apparent that the only points of contact is between the load bearing surface 60 of the tip 14 and the first and second load bearing pads 38,40 of the adaptor. When assembled, the first and second side surfaces 62,64 of the tip 14 are spaced from the respective first and second side surfaces 26,28 of the adaptor. Likewise, the first and second end surfaces 66,68 of the tip 14 are spaced from the respective first and second end surfaces 30,32 of the adaptor 12. During use, it is recognized that the tip 14 moves with respect to the adaptor 12 and physical contact between various parts of the tip 14 and adaptor 12 are possible. However, all of the downward forces that are applied from the machine through the compactor wheel 20 to the materials being crushed are transferred from the first and second load bearing pads 38,40 of the adaptor 12 to the load transferring surface 60 of the tip 14. Additionally, from a review of FIG. 3, it should be apparent that there is no contact between the inner surface 59 of the tip 14 and the peripheral surface 21 of the compactor wheel 20.

In order to hold the tip 14 onto the adaptor 12, the pin 18 is inserted through one passage of the pair of passages 74, the elastomeric spacer 80, the split spring retainer 78, the bore 42 of the adaptor 12, and the other passage of the pair of passages 74. During the insertion of the pin 18, the split retainer 78 is forced to spread open since the outer diameter of the pin 18 is larger than the internal diameter 82 of the split spring retainer 78. Once the pin 18 is inserted to its proper location, the groove 90 is in a position such that the split spring retainer 78 is at the same location and due to the groove 90, the split spring retainer 78 returns to its original relaxed condition. During use, the pin 18 is maintained in its proper position since movement in either direction would require a large force to open the split spring retainer 78 sufficiently for the pin 18 to slide therethrough.

In view of the foregoing, it is readily apparent that the structure of the tip and adaptor assembly 10 provides a simple arrangement that allows the tip 14 to be readily replaced when worn.

Other aspects, objects, and advantages of this invention can be obtained from a study of the drawings, the disclosure, and the appended claim.

I claim:

1. A tip and adaptor assembly adapted for use on a compactor wheel, comprising:

an adaptor having an inner surface adapted to be secured to the compactor wheel, first and second side surfaces each respectively sloping inwardly and outwardly from the inner surface, first and second end surfaces each respectively sloping inwardly and outwardly from the inner surface, an outer load transferring surface, a hole defined in the adaptor extending from the first side surface to the second side surface at a location spaced from the inner surface, and a counterbore defined in the adaptor extending from the first side surface and in axial alignment with the hole;

a tip having an inner mounting portion and an outer ground engaging portion, the outer ground engaging portion formed to include both a traction cleat portion and a demolition cleat portion disposed transversely of the traction cleat portion, the inner mounting portion includes a cavity defined therein adapted to freely receive the adaptor, a load transferring surface located on the tip at the bottom of the cavity and when the tip is assembled with the adaptor the load transferring surface of the tip contacts the outer load transferring surface of the adaptor, a pair of aligned passages defined in the inner portion of the tip opens into the cavity and, when assembled, the hole in the adaptor and the pair of aligned passages are in substantial alignment;

a pin retaining mechanism adapted to be disposed, when assembled, in the counterbore; and a pin adapted to be disposed, when assembled, through the pair of aligned passages in the tip, the pin retaining mechanism in the counterbore, and the hole in the adaptor.

* * * * *